Oct. 31, 1961   L. J. UMILE ET AL   3,007,111
VIBRATING REED COMB ASSEMBLY
Filed Oct. 21, 1957
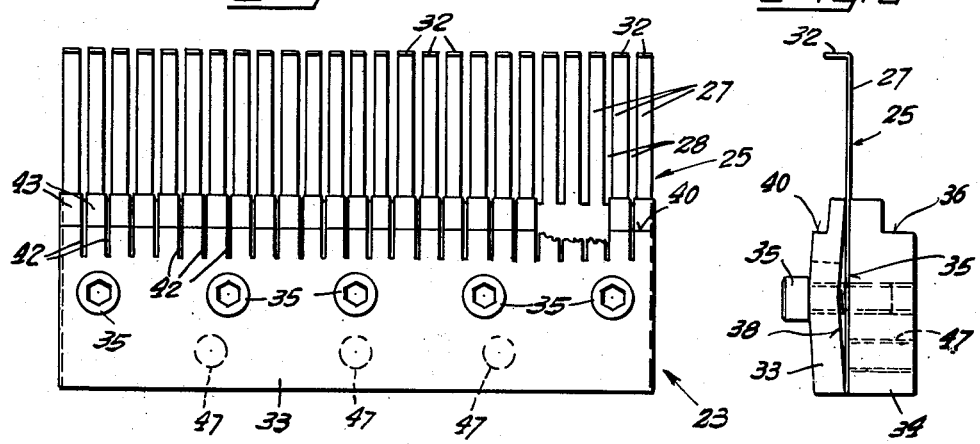
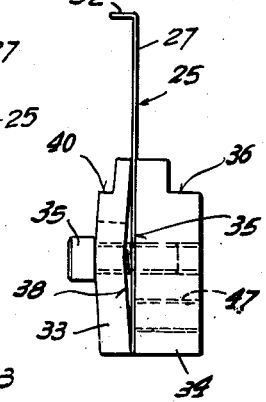
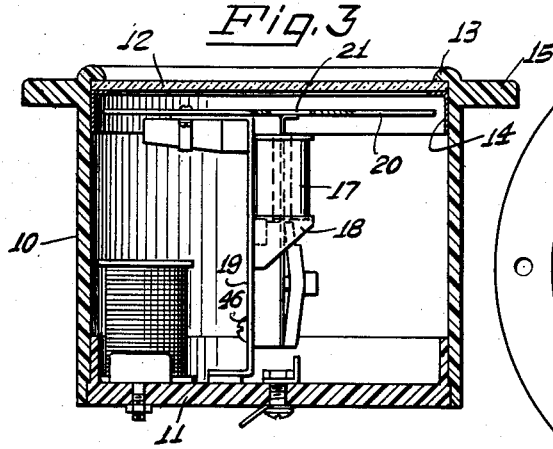
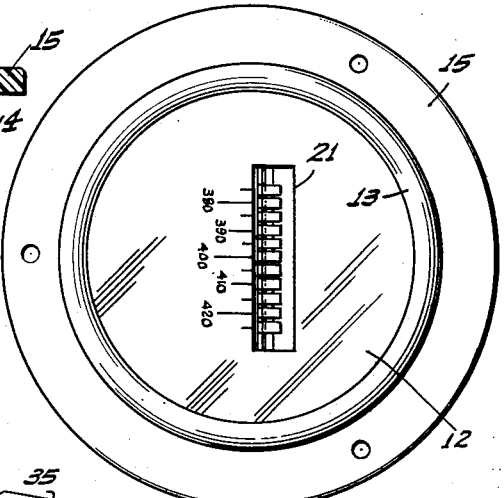
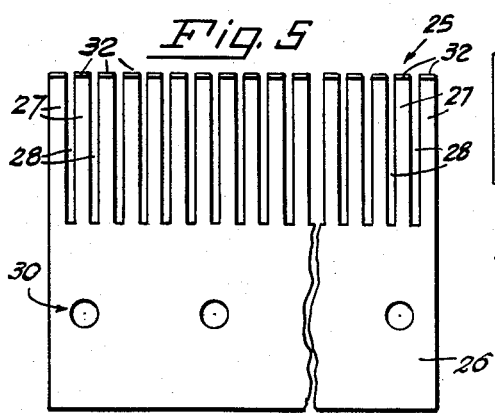
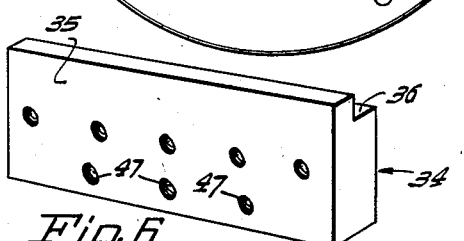
INVENTOR.
LOUIS J. UMILE
WILLIAM J. FITZGERALD
BY H. Gibner Lehmann
AGENT 3,007,111
VIBRATING REED COMB ASSEMBLY
Louis J. Umile, New Haven, and William J. Fitzgerald, West Haven, Conn., assignors to J. B. T. Instruments, Inc., New Haven, Conn., a corporation of Connecticut
Filed Oct. 21, 1957, Ser. No. 691,413
4 Claims. (Cl. 324—80)

This invention relates to frequency-responsive devices such as frequency meters, frequency relays and the like.

Heretofore it has been common practice to constitute a frequency meter of a plurality of vibratile members or reeds disposed in a row within a driving coil, said reeds being carried by a common mount in the form of a heavy metal block or the like. In the past, the reeds have been securely fastened to the mount by being held in a slit or in slits, and by being soldered in place whereby they constitute a unitary structure with the mount.

While this prior organization operated in a satisfactory manner, it had a number of drawbacks. For one thing, the slitting of the mounting block involved a precision machining operation which was somewhat expensive to carry out. Also, the procedure of soldering the reeds in place was slow and costly, and care had to be exercised to prevent excessive solder from being deposited on the reeds, as such solder had an adverse effect on the frequency of vibration of the reeds and further was subject to deterioration whereby after a period of use the frequency response of the reeds would change. To minimize this undesired effect, any excess solder was usually carefully removed without scarring or marking the bases of the reeds, and this operation represented additional time and cost, as well as requiring an appreciable amount of skill.

Efforts have been made in the past to eliminate the soldering procedure by clamping the reeds between two relatively heavy blocks, but this has not been satisfactory where high accuracy was required, in that the necessary solid and stable mounting of the reeds was not obtainable.

The above disadvantages and drawbacks of prior reed assemblies and reed mounting means are obviated by the present invention, and one object of the invention is to provide a novel and improved reed comb assembly comprising a plurality of reeds carried by solid mounting blocks, wherein a high degree of accuracy and uniformity in the mounting is obtainable by high production methods, thereby to obtain great accuracy in the response and readings of the group of reeds.

Another object of the invention is to provide a novel and improved reed assembly for a frequency-responsive device, as above characterized, which is simple in its construction, involves relatively few parts; and is economcal to fabricate and to assemble, thereby to reduce greatly the manufacturing cost while at the same time enabling high accuracy to be obtained.

A still further object of the invention is to provide an improved reed assembly as above set forth, which is permanent in its accuracy of response, thereby making for great reliability throughout an extended period of use.

A feature of the invention resides in the provision of a reed comb assembly having improved reliability such that it may be readily advantageously incorporated in sealed instrument casings without the likelihood of failure occurring during use, which would require either difficult servicing or else discarding of the entire instrument unit.

Another feature of the invention resides in the provision of a novel reed comb assembly for frequency-responsive meters, indicators and the like, wherein no soldering operations are required in mounting the reeds on the base or mounting block.

A still further feature of the invention resides in the provision of an improved comb assembly as above set forth, wherein the assembly of the reed and mounting means therefor may be done by personnel which are relatively unskilled, without having a detrimental effect on the accuracy and reliability of the assembly.

Other features and advantages will hereinafter appear.

In the drawings accompanying this specification, similar characters of reference indicate corresponding parts wherever possible in the several views, in which:

FIGURE 1 is a front elevational view of an improved reed comb assembly as made in accordance with the invention.

FIG. 2 is a side elevational view of the assembly shown in FIG. 1.

FIG. 3 is an axial sectional view of a frequency meter incorporating the improved reed comb assembly of the invention.

FIG. 4 is a face view of the meter shown in FIG. 3.

FIG. 5 is a plan view of a reed comb employed in the assembly of FIGS. 1 and 2.

FIG. 6 is a perspective view of one of the base members of the reed comb assembly, as provided by the invention.

While the present invention is shown herein in connection with a frequency-responsive device in the form of a frequency meter, it should be understood that the invention is not limited to this particular type of instrument, since it has utility when used with frequency relays and other indicator and/or control devices. Referring to FIGS. 3 and 4, the frequency meter illustrated therein comprises a casing 10 of generally cylindrical configuration, having a transverse back wall 11 and a front transparent window 12, the latter being held in place by an inwardly extended flange 13 on the casing, and by an annular retainer 14 secured within the casing. The usual mounting flange or mounting ears 15 may also be provided on the casing 10, as is well understood. Where conditions warrant or require it, the casing 10 may be constituted as a completely hermetically sealed unit, leads being brought to the exterior of the casing through sealed terminal or feed members in the well known manner.

Within the casing 10 there may be provided a driving coil 17, carried by brackets 18 which latter are secured to a supporting structure 19 mounted on the back wall 11 in any suitable manner. The supporting structure 19 may mount the usual dial or face 20, having a window 21 adjacent the front end of the coil 17.

In accordance with the present invention we provide a novel and improved frequency-responsive reed comb assembly 23 for disposition in the casing 10 with the reeds thereof extending through the driving coil 17, such assembly being characterized by high response accuracy, great reliability when in use, and low manufacturing cost. Such assembly involves the use of but few parts of simple structure, and is characterized by great ease in assembling the parts to each other without requiring appreciable skill on the part of the assembler.

As shown, the assembly 23 comprises a reed comb 25, FIGS. 1, 2 and 5, constituted of a single piece of sheet metal having suitable magnetic and resilient characteristics, such piece comprising a base portion 26 having aligned and coextensive vibratile reed portions 27 extending from one edge thereof. The reed comb 26 may be advantageously formed as a metal stamping, from sheet or strip stock with the grain of the metal extending in the direction best suited to the vibratile movement of the reeds 27. The comb 25 is provided with slits 28, in forming the reeds 27, and further has a row of apertures 30 in its base portion 26 to accommodate draft screws as will be later brought out.

The terminal portions of the reeds 27 are bent at right angles, to provide indicators or flags 32, which are suitably weighted by solder to effect the different resonant frequencies of the reeds.

Referring now to FIGS. 1 and 2, we provide a novel and improved mount for the reed comb 25, comprising a pair of mounting blocks 33 and 34 adapted to be clamped together in superposed relation by clamping screws 35 which pass through the openings 30 in the base 26 of the comb 25. The block 34 has a flat face 35 adapted to engage the base 26 of the comb, and preferably has its upper portion cut away to provide a thinner wall, terminating at a shoulder 36 as shown in FIGS. 2 and 6.

By the present invention the block 33 is formed so as to have a hollow face 38 for disposition against the base 26 of the comb, see FIG. 2. It is at present preferred to form the block 33, in obtaining the face 38, by a stamping operation which bends the block along substantially a central line extending between its two ends. Thereafter, the hollow face 38 is ground to provide a pair of planar surfaces intersecting each other along virtually a straight line. The upper edge portion of the block 33 is also cut away to provide a thinner wall terminating at a shoulder 40, as seen in FIGS. 1 and 2. In assembling the comb 25 to the mounting blocks 33 and 34, the clamping screws 35 are passed through the block 33 and the base 26 of the comb and threaded into the block 34. The screws 35 are then merely pulled up tight, to complete the assembly operation. No solder of any kind is required, nor is there any special skill needed in such assembly. Thus, the cost of the assemblage is greatly reduced.

We have found that a reed comb assembly as above constituted provides a very high degree of accuracy, and maintains such accuracy throughout an extended period of use. We attribute this to the two-point clamping contact established between the blocks 33 and 34 and the base portion 26 of the comb 25. Preferably, the slits 28 in the comb 25 extend for a short distance between the upper clamping edges of the blocks 33 and 34, thereby placing the lower extremities of the reeds 27 slightly below the uppermost edge surfaces of said blocks. This is clearly shown in the broken-away portion of FIG. 1.

Also, preferably the block 33 is provided with a plurality of coextensive slits 42 in its upper portion, such slits forming clamping fingers 43 along the upper marginal portion of the block 33, for engagement with the base portions of the reeds 27. By such construction an individual clamping action is obtained for each reed 27, thereby assuring a secure and stable mounting for the individual reeds.

The upper corner portions of the blocks 33 and 34 which engage and clamp against the opposite sides of the reeds 27 are preferably not perfectly sharp but instead slightly broken, as by the provision of a very small radius. Accordingly, there is no biting-in of the said upper corner portions into the reeds 27 even though the clamping screws 35 are pulled up tightly, and in consequence any tendency for the reeds to be severed at this point is completely eliminated.

The comb assemblage shown in FIGS. 1 and 2 may be mounted in the instrument by means of mounting screws 46 screwed into threaded holes 47 in the blocks 34, as will be readily understood.

The improved reed comb assembly as above set forth may be utilized with various types of instruments employed in indicating and controlling frequencies, or controlling equipment by virtue of periodic electrical waves or oscillations. The assemblage has special utility where the instrument casing is to be completely sealed, since the great reliability of the comb assembly obviates the necessity for servicing operations in connection therewith, or the necessity for discarding and replacing the instruments. Since no solder is used whatsoever in the mounting, no deterioration may occur due to cold-flowing of soft soldering alloy, as was heretofore the case with prior mounting means.

Variations and modifications may be made within the scope of the claims, and portions of the improvements may be used without others.

We claim:

1. In a frequency-responsive device, a reed comb assembly comprising a comb structure constituted of a strip of thin sheet metal, said comb structure having an expansive flat base portion and a plurality of integral reeds extending in parallel directions from one edge of said base portion, said reeds being co-extensive with each other, and a pair of mounting blocks disposed broadside to and on opposite sides of the said expansive base portion of the comb structure and engaged with the latter, said blocks having pairs of corresponding opposed edges respectively engaging and clamping the comb structure along a pair of spaced elongated narrow and straight lines extending along and at opposite marginal areas of the said base portion, one pair of edges clamping a marginal area of said base portion remote from the said reeds and said edges constituting the sole clamping means of the blocks for holding the comb assembly, said blocks having a pair of opposed faces one of which is hollow, disposed closely adjacent the said base portion, the other of said faces of the blocks engaging one side of the base portion and the remaining side of the base portion being free of any engagement with the blocks except at the said opposed edges of the blocks; and draft means disposed between the clamping edges of the blocks, passing through and securing the said blocks and base portion of the reed comb structure together in clamped relation.

2. In a frequency-responsive device, a reed comb assembly comprising a comb structure constituted of a strip of thin sheet metal, said comb structure having an expansive flat base portion and a plurality of integral reeds extending in parallel directions from one edge of said base portion, said reeds being co-extensive with each other; and a pair of mounting blocks disposed broadside to and on opposite sides of the said expansive base portion of the comb structure and engaged with the latter, said blocks having pairs of corresponding opposed edges respectively engaging and clamping the comb structure at the said base portion, one pair of edges clamping an area of said base portion remote from the said reeds, said blocks having a pair of opposed faces one of which is hollow, disposed closely adjacent the said base portion, the other of said faces of the blocks engaging one side of the base portion and the remaining side of the base portion being free of any engagement with the blocks except at the said opposed edges of the blocks; and means disposed between the clamping edges of the blocks, securing the said blocks and base portion of the reed comb structure together in clamped relation, the clamping edge of one of said blocks being straight and having a plurality of slits dividing said edge into a number of portions equal in number to the reeds of the said comb structure.

3. In a frequency-responsive device, a reed comb assembly comprising a comb structure constituted of a strip of thin sheet metal, said comb structure having an expansive flat base portion and a plurality of integral reeds extending in parallel directions from one edge of said base portion, said reeds being co-extensive with each other, and a pair of mounting blocks disposed broadside to and on opposite sides of the said expansive base portion of the comb structure and engaged with the latter, said blocks having pairs of corresponding opposed edges respectively engaging and clamping the comb structure at the said base portion, one pair of edges clamping an area of said base portion remote from the said reeds, said blocks having a pair of opposed faces one of which is hollow, disposed closely adjacent the said base portion, the other of said faces of the blocks engaging one side of the base portion and the remaining side of the base portion being free of any engagement with the blocks except at the said opposed edges of the blocks; and means disposed between the clamping edges of the blocks, securing the said blocks and base portion of the reed comb structure together in clamped relation, the clamping edge of one of said blocks being straight and having a plurality of slits dividing said edge into a number of portions equal in number to the reeds of the said comb structure, the said slitted block being the one which has the hollow face.

4. In a frequency-responsive device, a reed comb assembly comprising a comb structure constituted of a strip of thin sheet metal, said comb structure having an expansive flat base portion and a plurality of integral reeds extending in parallel directions from one edge of said base portion, said reeds being co-extensive with each other; and a pair of mounting blocks disposed broadside to and on opposite sides of the said expansive base portion of the comb structure and engaged with the latter, said blocks having pairs of corresponding opposed edges respectively engaging and clamping the comb structure at the said base portion, one pair of edges clamping an area of said base portion remote from the said reeds, said blocks having a pair of opposed faces one of which is hollow, disposed closely adjacent the said base portion, the other of said faces of the blocks engaging one side of the base portion and the remaining side of the base portion being free of any engagement with the blocks except at the said opposed edges of the blocks; and means disposed between the clamping edges of the blocks, securing the said blocks and base portion of the reed comb structure together in clamped relation, the base portion of the comb structure being slightly less in height than the height of the mounting blocks whereby the portions of the reeds immediately adjoining the expansive base portion are disposed between one pair of the said opposed edges of the blocks.

References Cited in the file of this patent

UNITED STATES PATENTS

| | | |
|---|---|---|
| 959,934 | Hartmann-Kempf | May 31, 1910 |
| 1,253,402 | Lovejoy | Jan. 15, 1918 |
| 1,430,379 | Hubbell | Sept. 26, 1922 |
| 2,356,229 | Dunlap | Aug. 22, 1944 |
| 2,445,304 | Grace | July 13, 1948 |
| 2,474,387 | Wallace | June 28, 1949 |
| 2,733,031 | Morgillo | Jan. 31, 1956 |
| 2,916,700 | Daschke | Dec. 8, 1959 |

FOREIGN PATENTS

| | | |
|---|---|---|
| 212,532 | Germany | Aug. 4, 1909 |
| 216,099 | Germany | Nov. 11, 1910 |
| 240,401 | Germany | Nov. 3, 1911 |
| 143,755 | Switzerland | Feb. 2, 1931 |